Sept. 27, 1966    W. R. TEDESCHI ET AL    3,275,201
FLUX COMPOSITION PACKAGE
Filed March 10, 1964
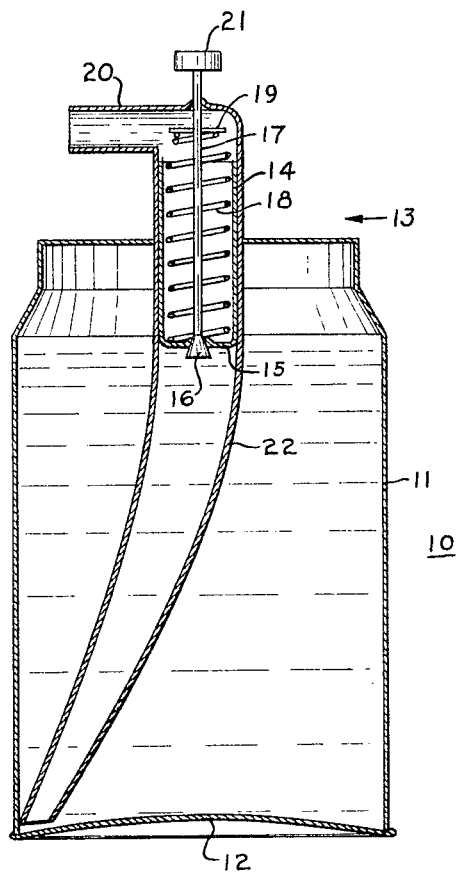
INVENTORS
WILLIAM R. TEDESCHI
DONALD A. McCARTHY
BY [signature]
AGENT

United States Patent Office 3,275,201
Patented Sept. 27, 1966

3,275,201
FLUX COMPOSITION PACKAGE
William R. Tedeschi, Norwich, and Donald A. McCarthy, Milford, Conn., assignors to General Dynamics Corporation, New York, N.Y., a corporation of Delaware
Filed Mar. 10, 1964, Ser. No. 350,814
21 Claims. (Cl. 222—402.25)

The present invention relates to an improved flux composition, and more particularly, to an improved brazing, welding, or soldering flux composition in a pressurized package form in which the flux composition is dispensed from a container by pressure of vapor from a propellant of the liquid-vapor type.

The satisforctory bonding of metallic surfaces by means of another or more fusible metal or alloy cannot be obtained unless the surfaces to be joined are first thoroughly cleaned and then maintained in this condition during the heating operation. To achieve this desired cleaning and maintenance of the surfaces in a cleaned state, compositions known as fluxes are probably the most widely used since they can be adapted not only to remove any adhering film of metallic oxide, oil, grease, etc. from the surface of the metal, but also to maintain the cleaned metallic surface free from oxide impurities which would otherwise be formed during the heating operation.

A wide variety of different materials have been employed over the years in formulating various flux compositions. In general, the flux composition most commonly employed have been inorganic acids, and inorganic salts of such acids. To a lesser extent, organic salts of the inorganic acids as well as other organic materials have also been employed as flux materials. The manner of application of the flux compositions likewise has widely varied with the compositions being used in a liquid state, semi-liquid state, paste form, and also in a dry state. The method of application most commonly used, however, is in the form of an aqueous solution in which the composition may contain up from 60 to 70% of water. Such solutions are applied to the surface of the metals to be joined generally by means of a brush. This mode of application possesses many inherent disadvantages which have been found objectionable. For example, the application by means of a brush oftentimes results in an uneven and improper layer of flux material on the metal surfaces to be joined. Furthermore, this form oftentimes results in an indiscriminate dropping of the flux or solution in the immediate vicinity of the parts to be joined, which necessitates a clean-up, particularly where the flux is corrosive in nature. Furthermore, the brush application of flux compositions, particularly acidic or corrosive compositions, is oftentimes hazardous to the health and person of a worker, especially in a confined area where the flux may splatter onto the worker or into his eyes, ears, or throat. From an operational standpoint, aqueous flux solutions are oftentimes undesirable since the water does not readily and rapidly evaporate from the metal surfaces to leave the metal surfaces coated with flux. Liquid water in a wet flux bubbles and blisters as the metal surface is heated through the temperature range of boiling water. This bubbling and boiling blisters and often destroys the evenness of the flux coating and thereby exposes the underlying surface, which is objectionable to the fluxing process. Furthermore, the presence of water on many types of equipment to be united is highly objectionable since the water may effect a corrosion of the metal, or will otherwise impair the efficiency of same. In an effort to eliminate some of these disadvantages, the fluxes have been combined with non-aqueous solvents or carriers. However, organic solvents in lieu of water have not eliminated the disadvantages inherent with liquid since they do not insure a uniform application of the fluxing film on the metal surface to be joined, nor do they eliminate the problem of clean-up after brush application. An addition objection to non-aqueous flux compositions is the cost involved with respect to various non-aqueous carriers. As a result, non-aqueous flux solutions have not received widespread usage except in areas where the presence of water is virtually prohibited.

Still another form of flux composition that has been employed is in paste or semi-paste form in which the composition is applied by means of a brush in a manner similar to the liquid solutions. However, the application in paste or semi-paste form does not insure a uniform coating of the flux composition on the metal surface to be joined. Moreover, the paste or semi-liquid forms of the flux composition heretofore employed have necessitated considerable cleaning up of the metal surfaces after the welding, soldering, or brazing has been effected in order to insure the removal of flux residue from the metal surfaces.

It is therefore a principal object, in the elimination of the foregoing and related disadvantages, to provide a new and novel flux composition eliminating all objectionable characteristics inherent with prior flux compositions.

Another object of the present invention is the provision of a new and novel flux composition in package form.

Still another object of the present invention is the provision of a new and novel flux composition in package form in which the flux is applied to the metal surface in aerosol form.

A further abject of the present invention is the provision of a new and novel flux composition in package form particularly adaptable as a soldering or brazing flux.

Still another object of the present invention is the provision of a new and novel flux composition in package form particularly adaptable as a brazing flux.

Yet another object of the present invention is the provision of a flux composition in package form which will insure a uniform application of a flux film over the entire metal surfaces to be joined.

Another object of the present invention is the provision of a new novel flux composition in package form that requires no clean-up after use.

Still another object of the present invention is the provision of a soldering flux composition which is safe to use without harm to a worker.

Yet another object of the present invention is the provision of a new and novel flux composition that will not be deposited accidentally or otherwise on areas surrounding the joints to be united.

A further object of the present invention is the provision of a new and novel flux composition in package form in which the carrier for the flux material is instantaneously volatilized.

Another object of the present invention is the provision of a new and novel flux composition that is non-toxic and does not irritate the eyes and mucous membranes of the worker.

A further object of the present invention is the provision of a new and novel flux composition in package form that will not impart harmful moisture or other harmful residue onto the metal surfaces.

Still another object of the present invention is the provision of a new and novel flux composition that is economical to employ.

Other and additional objects will become manifest from the ensuing description.

In accordance with the present invention, the disadvantages of prior flux compositions have been eliminated by providing a pressurized package in which the flux material is placed in liquid admixture with a propellant of the liquid vapor type and the composition confined in the container under the vapor pressure of the propellant.

This package thus produces a pressurized container of the flux composition in which the flux composition is sprayed in aerosol form through a nozzle of the container to the metal surfaces of the joints to be united. It is also within the purview of the present invention to provide a pressurized package in which the fluxing composition will also function as the propellant.

Broadly stated, the flux composition of the present invention is a flux package comprising a pressure type container having a valve-controlled opening containing a flux composition for use in producing a uniformly evenly applied flux film, the flux composition comprising a metal alloy fluxing compound and a volatile propellant in liquid phase, the composition being confined in the container under the vapor pressure of the propellant, said flux and said propellant being the same or separate materials. More specifically, the flux composition of the present invention within the pressurized container comprises the following ingredients by percent weight:

|  | Range | |
| --- | --- | --- |
|  | Broad, percent | Preferred, percent |
| Flux agent | 0.01–100 | 7 |
| Propellant | 0.01–100 | 70 |
| Carrier | 0.00–80 | 13 |

When the fluxing agent and the propellant are the same material, only one of the stated compounds will be present. However, when the compounds are present as separate compounds, the sum total of the two will be present in the range enumerated. Similarly, the carrier may be omitted if desired, or may be present as a separate compound. Alternatively, the propellant may function as a carrier.

To the accomplishment of the foregoing and related ends, the present invention then consists of the means hereinafter fully described and particularly pointed out in the claims, the annexed drawing and the following description setting forth in detail certain means in the carrying out of the invention, such disclosed means illustrating, however, but one of various ways in which the principle of the invention may be employed.

The present invention is illustrated, by way of example, in the accompanying drawing, in which:

FIGURE 1 is a cross-sectional view of an illustrative embodiment of one form of a flux composition in package form made in accordance with the present invention.

*Fluxing agent*

The fluxing agent to be employed in the present invention may be any fluxing agent or mixtures thereof that have been found suitable for use in the brazing, welding, or soldering of two metal parts to one another. Such fluxing agents may be acid or non-acidic in character, and must be capable of being dispersed in or miscible with the propellant employed. Examples of such flux agents which have been found to be suitable for use in the present invention are boric acid, alkali metal salts of boric acid, such as, for example, potassium tetraborate, potassium pentaborate, borax, etc.; mineral acids, such as, for example, hydrochloric, hydrofluoric, sulphuric, and phosphoric acid; and salts thereof, such as, for example, zinc chloride, potassium silico fluoride, potassium bromide, ammonium chloride, lithium fluoride, copper chloride, cadmium chloride, stannic chloride, sodium fluoride, potassium fluoride, zinc dehydrazine chloride, potassium chloride, calcium chloride, calcium fluoride, magnesium chloride, potassium phosphate, etc. Other compounds that may be used in fluxing agents are rosin, hydrazine dehydrochloride, ethyl dimethyl cetyl ammonium bromide, amyl acetate, stearic acid, sodium carbonate, methyl salicylate, etc. Also suitable for use are various organic fluxing agents, such as, for example, alkyl borates, i.e., ethyl borate, methyl borate, potassium bitartrate, etc. Therefore, it is seen that there are a wide variety of fluxing agents capable of being employed in the present invention to effect the desired fluxing during the brazing, welding, or soldering of two metal parts. Suitable examples of other fluxing agents that may be employed in the present invention are those compositions found, for example, in United States Patents Nos. 2,174,551, 2,196,853, 2,452,995, 2,440,592. It is to be clearly understood that while the individual materials function satisfactorily as fluxing agents in general, the fluxing agent of the present invention will be a mixture of one or more of the foregoing ingredients. Moreover, the proportions will vary, as hereinbefore indicated, if the material employed functions both as the fluxing agent and the propellant. In the event of a dual function ingredient, such material may be present in the range 0.01–100%, with no propellant being required. However, if there are to be two separate materials employed as the fluxing agent and the propellant, the fluxing agent will be present in the range 0.01–40%. A particular and preferred range is 2.0–25% when the fluxing agent is employed with a separate propellant.

It is to be noted that the fluxing agents of the type hereinbefore enumerated may include other ingredients apart from the actual fluxing materials. For example, such agents may include wetting agents, rust inhibitors, and the like. Therefore, the fluxing agents enumerated herein include the addition of other materials possessing functions collateral to that of the fluxing agents.

*The propellant*

The propellant to be employed in the present invention may be any volatile material that normally exists as a gas at ordinary room temperatures and exists largely as a liquid at elevated pressures and is practically maintainable in suitable containers for the flux composition. The propellant employed should be one that would have no corrosive effect on the metal surfaces, and should not tend to burn or otherwise deleteriously affect the person or clothing of the worker using same. However, it is to be clearly understood that propellant materials normally corrosive to metals can be employed as a propellant if a liner inert to the propellant is employed on the metal surface. In certain cases where excessive heat may be encountered, it is undesirable to employ materials which are suitable as propellants but are flammable. However, in general, such propellants will be found to be safe for general use.

The propellant to be employed may be any material or mixtures that the fluxing agent, or the fluxing agent combined with a carrier, is dispersible with insoluble, partially soluble, or soluble. In general, the majority of the fluxing agents will be insoluble or partially soluble with the propellant material, although certain of the fluxing materials will be soluble in the propellant when in a liquefied state. When the flux is soluble in the propellant, the flux will be sprayed on the metal stock and a residual film satisfactory for brazing or the like remains on the metal stock.

One class of materials that have been found to be of particular utility as propellants in the present invention are the partially fluorinated and partially or wholly chlorofluorinated hydrocarbons having vapor pressures within the range from about 15 to about 300 lb. p.s.i.g. at 0° C., and preferably about 30 to 80 lbs. p.s.i.g. at 0° C. The propellant may be formed of a mixture of two or more hydrocarbons which, although the individual compounds may have vapor pressures outside the desired range, have, when combined, a vapor pressure within that range. The solubility of this particular class of propellants or propellant mixtures should be such that they exist mainly as a liquid phase and, in general, undissolved in the flux composition when the two are mixed under pressure sufficient to maintain the propellant in the liquid phase. However, with respect to certain flux materials, such as, for example, stearic acid, it has been found that such flux materials are soluble in this class of hydrocarbons. Such resulting compositions in a dissolved state have been found to be suitable for use since the residual film imparted on the metal surfaces to be bonded functions satisfactorily as a flux during the brazing, welding, or soldering of the parts.

Of the foregoing class of hydrocarbons, particular hydrocarbons which have been found to be of special utility in formulating the flux package of the present invention are substantially water-insoluble fluorine and fluorine substituted hydrocarbons of the proper vapor pressure range. Suitable examples of these propellants are: 1,2 dichlor 1,1,2,2 tetrafluorethane, trichlortrifluorethane, dichlordifluormethane, monochlordifluormethane, monofluortrichlormethane, 1,1 difluorethane, 1 monochlor 1,1 difluorethane, octofluorocyclobutane, etc.

Of the foregoing illustrative compounds of the class of halogenated hydrocarbons, the most satisfactory ones will be found to be the hydrocarbons in which all of the hydrogen atoms are replaced by chlorine and fluorine, and in which the number of fluorine atoms equals or exceeds the number of chlorine atoms. Mixtures of different propellant compounds are useful for providing the particular vapor pressure desired, and propellants comprising mixtures of dichlorodifluormethane and 1,2- dichlor 1,1,2,2 tetrafluorethane, of monofluortrichlormethane and dichlordifluormethane and of trichlortrifluorethane and dichlordifluormethane are satisfactory for this purpose. For example, dichlordifluormethane, which has a vapor pressure of about 70 lbs. p.s.i.g. and 1,2 dichlor 1,1,2,2 tetrafluormethane with a vapor pressure of about 13 lb. p.s.i.g. at 70° F., may be mixed in various proportions to form a propellant having an intermediate vapor pressure which is well suited for use in relatively inexpensive containers.

The fluorinated chlorinated hydrocarbons in which all of the hydrogen atoms are replaced by chlorine and fluorine and in which the number of fluorine atoms in the molecule equals or exceeds the number of chlorine atoms are particularly desirable with the general class of flux materials. Such hydrocarbons have low solubilities—only a few cubic centimeters of the gas being soluble per 100 grams of water at room temperature and one atmosphere pressure. The fluorinated chlorinated propellant compounds which do not meet the foregoing requirements as to hydrogen atom substitution are less desirable. This is true of monochlordifluormethane, which has one unreplaced hydrogen atom in the molecule. Similarly, 1 monochlor 1,1 difluorethane, which has three unreplaced hydrogen atoms in the molecule, is a less desirable propellant. So also is monofluortrichlormethane, which has more chlorine than fluorine atoms in the molecule. However, the foregoing may be used in admixture with the more desirable propellants, in which case their undesirable effects are less evident.

Another class of materials suitable for use as propellants are the straight chain saturated aliphatic hydrocarbons having a suitable vapor pressure. Examples of such compounds suitable for use in the present invention are propane, butane, isobutane, cyclobutane, etc. The only difficulty that may be encountered in the use of these materials is their flammability characteristics. If there is the probability of high temperatures being encountered in a particular area of use, other non-flammable propellants are recommended. However, in general, the saturated aliphatic hydrocarbons will be found to be effective and safe to use. Another class of compounds that possess excellent propellant characteristics, although being flammable, are the not completely fluorinated substituted aliphatic hydrocarbons, such as, for example, 1,1 difluorethane. These materials, however, will be found suitable for use in most cases in the present invention.

Another class of materials that have been found suitable for use in the formation of the flux package of the present invention are the inorganic propellants having a suitable vapor pressure. Examples of such materials are carbon dioxide, nitrous oxide, etc. In the utilization of these particular materials as propellants, care should be exercised in the selection of the fluxing agent to be combined therewith. Certain fluxing agents may tend to be reactive with these compounds when in a confined pressurized state. Accordingly, the fluxing agents utilized with the inorganic propellants should be quite stable and substantially neutral or slightly basic in character.

The vapor pressure of the propellant at normal room temperature determines the rapidity with which the flux film is formed when the pressure on it is reduced to atmospheric pressure. To insure that the flux agent will be expelled from the container in aerosol form, the vapor pressure of the propellant must be greater than 15 lb. p.s.i.g. at 0° C. If the vapor pressure is less than 15 lb. p.s.i.g. at 0° C., the flux would emerge from the container in fluid form as distinct from an aerosol form, and would not impart the uniform film or flux on the metal surfaces. The upper limit of the propellant vapor pressure is not critical and is determined by considerations of safety and economy depending upon the type of container used, such as, for example, mass produced inexpensive containers of the type used for beer gives the maximum propellant pressure which should not exceed about 60 lb. p.s.i.g. at room temperature. Moreover, the higher the vapor pressure of the propellant, the greater is the proportion thereof required to fill the head space in the can as the flux material is withdrawn therefrom. A practical range of propellant vapor pressures, when using can type mass produced containers, lies between about 15–65 lb. p.s.i.g. at 0° C.

The amount of propellant to be employed in formulating the flux package of the present invention is not critical but is determinative of flux film to be produced on the metal surfaces. For example, the greater proportion of propellant to be employed, the thinner the flux film. Moreover, the amount of propellant to be employed will also be determined by whether or not a carrier or solvent is employed for the fluxing. Furthermore, as hereinbefore indicated, the function of the propellant and the fluxing agent may be performed by the use of a single material. In this event, there will be only one compound satisfying both requirements and may be present in an amount up to 100%. If there is a separate fluxing agent and a separate propellant, the propellant will be present in the range 10–99%. It is to be understood also, as hereinbefore indicated, that the propellant may also function as a carrier. In this event, the enumerated range is intended to include the propellant and no carrier, and the propellant and a carrier as separate compounds and the propellant function both as a carrier and a propellant. A preferred range for the propellant employed as a separate component in the flux package of the present invention is 25–80%.

*The carrier*

A carrier for the fluxing agent may be employed, if desired or required, in formulating the flux package of the present invention. This will be found particularly advantageous and desirable with certain fluxing agents and the areas of use of such materials. A suitable carrier which will aid in supplying the flux agent in aerosol form when dispensed from the container may be employed. The carrier, when employed, is preferably a liquid and may be water, an aqueous solution, organic solvents, such as, for example, aliphatic alcohols, i.e., ethylalcohol, methyl alcohol, propyl alcohol, ethylene glycol, etc.; alkenes, i.e., perchloroethylene, trichloroethylene, etc.; alkenes, i.e., perchloroethylene, trichloroethylene, etc.; alkanes, i.e., 1,1,1 trichloroethane; and ketones, i.e., acetone. It is also to be clearly understood that the propellant employed in dispensing the flux composition may also function as a carrier. As will be pointed out more fully hereinafter, the propellant employed may dissolve the flux agent or otherwise disperse same such that when dispensed, the flux material will form a fluxing film on the metal surface to be joined.

From the foregoing, it is believed readily apparent that any readily volatile liquid in which the fluxing agent is dispersible or soluble may be used, if desired, in formulating the pressurized flux package of the present invention. Similarly, if the carrier is not to be present a propellant may be employed which will function as the carrier. When employed, the carrier will be present in the range 0.0% to 98%, with the upper range including these materials functioning both as propellants and carriers. If a separate carrier and a separate propellant are to be employed, the carrier may be present in an amount up to 80%. The preferred amount of the carrier as a separate material is about 23%.

EXAMPLES

The following are examples of flux compositions made in accordance with the present invention, the percentage of ingredients being given by weight. It is to be understood that the flux composition in each of the examples is confined under the vapor pressure of the propellant at the prevailing temperatures until a flux film is required, whereupon a suitable proportion of the composition is released at atmospheric pressure and emerges as a fluxing agent in aerosol form. The pressure enumerated for the flux packages is p.s.i.g. @ 70° F. Also, in the examples the chlorofluorinated hydrocarbons are identified as Freons. In the enumerated examples, Freon-11 is trichloromonofluoromethane; Freon-12 is dichlorodifluoromethane; Freon-113 is trichlorotrifluoroethane; Freon-112 is tetrachlorodifluoroethane, and Freon-114 is dichlorotetrafluorethane.

*Example 1*

| | Percent |
|---|---|
| Potassium acid fluoride | 24 |
| Potassium pentaborate | 6 |
| Freon-113 | 10 |
| Freon-12 | 60 |
| Pressure | 30–40 |

*Example 2*

| | Percent |
|---|---|
| Potassium acid fluoride | 8 |
| Potassium pentaborate | 2 |
| Perchloroethylene | 55 |
| Freon-11 | 10 |
| Freon-12 | 25 |
| Pressure | 35–40 |

*Example 3*

| | Percent |
|---|---|
| Boric acid | 7 |
| 1,1,1 trichloroethane | 23 |
| Freon-12 | 70 |
| Pressure | 35–40 |

*Example 4*

| | Percent |
|---|---|
| Zinc chloride | 2.5 |
| Ammonium chloride | 2.5 |
| Water | 70 |
| Freon-12 | 25 |
| Pressure | 25–35 |

*Example 5*

| | Percent |
|---|---|
| Potassium acid fluoride | 8 |
| Potassium pentaborate | 2 |
| Water | 20 |
| Freon-11 | 10 |
| Freon-12 | 60 |
| Pressure | 35–40 |

*Example 6*

| | Percent |
|---|---|
| Potassium acid fluoride | 7 |
| Trichloroethylene | 25 |
| Freon-12 | 68 |
| Pressure | 35–40 |

*Example 7*

| | Percent |
|---|---|
| Potassium pentaborate | 3.5 |
| Potassium acid fluoride | 3.5 |
| Perchloroethylene | 23 |
| Freon-12 | 70 |
| Pressure | 35–40 |

*Example 8*

| | Percent |
|---|---|
| Potassium tetraborate | 2.0 |
| Potassium acid fluoride | 2.0 |
| Boric acid | 2.0 |
| Perchloroethylene | 23 |
| Freon-12 | 70 |
| Pressure | 35–40 |

*Example 9*

| | Percent |
|---|---|
| Potassium tetraborate | 2.0 |
| Potassium acid fluoride | 2.0 |
| Boric acid | 2.0 |
| Water | 25 |
| Freon-12 | 68 |
| Pressure | 35–40 |

*Example 10*

| | Percent |
|---|---|
| Boric acid | 7.0 |
| Monohydric alcohol | 33.0 |
| Freon-114 | 60 |
| Pressure | 30–40 |

*Example 11*

| | Percent |
|---|---|
| Zinc chloride | 6.0 |
| Zinc dehydrazine chloride | 1.0 |
| Acetone | 23.0 |
| Freon-12 | 70 |
| Pressure | 35–40 |

*Example 12*

| | Percent |
|---|---|
| Rosin (mod. maleic ester) | 5.0 |
| Hydrazine dihydrochloride | 0.8 |
| Ethyl dimethyl cetyl ammonium-bromide | 0.2 |
| Amyl acetate | 1.0 |
| Methyl alcohol | 23.0 |
| Freon-114 | 70 |
| Pressure | 35–40 |

*Example 13*

| | Percent |
|---|---|
| Boric acid | 2.0 |
| Sodium borate | 0.3 |
| Potassium silico fluoride | 3.0 |
| Potassium acid fluoride | 1.5 |
| Titanium powder | 0.2 |
| Perchloroethylene | 23.0 |
| Freon-12 | 70 |
| Pressure | 35–40 |

Example 14

| | Percent |
|---|---|
| Zinc chloride | 5.0 |
| Ammonium chloride | 1.0 |
| Sodium fluoride | 0.2 |
| Potassium bromide | 0.8 |
| Water | 23.0 |
| Freon-12 | 70 |
| Pressure | 35–40 |

Example 15

| | Percent |
|---|---|
| Zinc chloride | 2 |
| Ammonium chloride | 1 |
| Stannic chloride | 0.5 |
| Cadmium chloride | 0.25 |
| Methyl salicylate | 1.25 |
| Water | 70.0 |
| Freon-12 | 25 |
| Pressure | 15–25 |

Example 16

| | Percent |
|---|---|
| Boron trifluoride | 5.0 |
| Ethylene glycol | 25.0 |
| Freon-12 | 70.0 |
| Pressure | 35–40 |

Example 17

| | Percent |
|---|---|
| Sodium carbonate | 1.0 |
| Sodium fluoride | 1.0 |
| Calcium fluoride | 1.0 |
| Borax | 3.0 |
| Water | 27.0 |
| Freon-12 | 67.0 |
| Pressure | 30–40 |

Example 18

| | Percent |
|---|---|
| Potassium acid fluoride (1 part by wt.), potassium pentaborate (1 part by wt.), boric acid (1 part by wt.) | 7 |
| Perchloroethylene | 23 |
| Freon-12 | 70 |
| Pressure | 35–40 |

Example 19

| | Percent |
|---|---|
| Boron trifluoride | 100 |
| Pressure | 35–40 |

Example 20

| | Percent |
|---|---|
| Sodium carbonate | 1.0 |
| Sodium fluoride | 1.0 |
| Calcium fluoride | 1.0 |
| Borax | 3.0 |
| Water | 27.0 |
| Freon-12 | 67.0 |
| Pressure | 30–40 |

Example 21

| | Percent |
|---|---|
| Zinc chloride | 2.5 |
| Ammonium chloride | 2.5 |
| Water | 70 |
| Carbon dioxide | 25 |
| Pressure | 25–35 |

Example 22

| | Percent |
|---|---|
| Zinc chloride | 5.0 |
| Ammonium chloride | 1.0 |
| Sodium fluoride | 0.2 |
| Potassium bromide | 0.8 |
| Water | 23.0 |
| Carbon dioxide | 70 |
| Pressure | 35–40 |

Example 23

| | Percent |
|---|---|
| Zinc chloride | 2 |
| Ammonium chloride | 1 |
| Stannic chloride | 0.5 |
| Cadmium chloride | 0.25 |
| Methyl salicylate | 1.25 |
| Water | 70.0 |
| Carbon dioxide | 25 |
| Pressure | 15–25 |

Example 24

| | Percent |
|---|---|
| Sodium carbonate | 1.0 |
| Sodium fluoride | 1.0 |
| Calcium fluoride | 1.0 |
| Borax | 3.0 |
| Water | 27.0 |
| Carbon dioxide | 67.0 |
| Pressure | 35–40 |

Example 25

| | Percent |
|---|---|
| Zinc chloride | 2.5 |
| Ammonium chloride | 2.5 |
| Water | 70 |
| Nitrous oxide | 25 |
| Pressure | 25–35 |

Example 26

| | Percent |
|---|---|
| Zinc chloride | 5.0 |
| Ammonium chloride | 1.0 |
| Sodium fluoride | 2.0 |
| Potassium bromide | 0.8 |
| Water | 23.0 |
| Nitrous oxide | 70 |
| Pressure | 35–40 |

Example 27

| | Percent |
|---|---|
| Zinc chloride | 2 |
| Ammonium chloride | 1 |
| Stannic chloride | 0.5 |
| Cadmium chloride | 0.25 |
| Methyl salicylate | 1.25 |
| Water | 70.0 |
| Nitrous oxide | 25 |
| Pressure | 15–25 |

Example 28

| | Percent |
|---|---|
| Sodium carbonate | 1.0 |
| Sodium fluoride | 1.0 |
| Calcium fluoride | 1.0 |
| Borax | 3.0 |
| Water | 27.0 |
| Nitrous oxide | 67.0 |
| Pressure | 35–40 |

Example 29

| | Percent |
|---|---|
| Potassium acid fluoride | 24 |
| Potassium pentaborate | 6 |
| Butane | 70 |
| Pressure | 35–40 |

Example 30

| | Percent |
|---|---|
| Boric acid | 7 |
| 1,1,1 trichloroethane | 23 |
| Butane | 70 |
| Pressure | 35–40 |

Example 31

| | Percent |
|---|---|
| Potassium acid fluoride | 8 |
| Potassium pentaborate | 2 |
| Water | 20 |
| Butane | 70 |
| Pressure | 35–40 |

Example 32

| | Percent |
|---|---|
| Potassium tetraborate | 2.0 |
| Potassium acid fluoride | 2.0 |
| Boric acid | 2.0 |
| Perchloroethylene | 24 |
| Butane | 70 |
| Pressure | 35–40 |

Example 33

| | Percent |
|---|---|
| Boric acid | 7.0 |
| Monohydric alcohol | 33.0 |
| Butane | 60 |
| Pressure | 30–40 |

Example 34

| | Percent |
|---|---|
| Potassium acid fluoride | 8 |
| Potassium pentaborate | 2 |
| Perchloroethylene | 55 |
| Propane | 35 |
| Pressure | 35–40 |

Example 35

| | Percent |
|---|---|
| Zinc chloride | 2.5 |
| Ammonium chloride | 2.5 |
| Water | 70 |
| Propane | 25 |
| Pressure | 25–35 |

Example 36

| | Percent |
|---|---|
| Potassium acid fluoride | 7 |
| Trichloroethylene | 25 |
| Propane | 68 |
| Pressure | 35–40 |

Example 37

| | Percent |
|---|---|
| Potassium pentaborate | 3.5 |
| Potassium acid fluoride | 3.5 |
| Perchloroethylene | 23 |
| Propane | 70 |
| Pressure | 35–40 |

Example 38

| | Percent |
|---|---|
| Potassium tetraborate | 2.0 |
| Potassium acid fluoride | 2.0 |
| Boric acid | 2.0 |
| Water | 25 |
| Propane | 68 |
| Pressure | 35–40 |

Example 39

| | Percent |
|---|---|
| Boric acid | 7 |
| 1,1,1 trichloroethane | 23 |
| 1,1 difluorethane | 70 |
| Pressure | 35–40 |

Example 40

| | Percent |
|---|---|
| Potassium tetraborate | 2.0 |
| Potassium acid fluoride | 2.0 |
| Boric acid | 2.0 |
| Water | 25 |
| 1,1 difluorethane | 68 |
| Pressure | 35–40 |

Example 41

| | Percent |
|---|---|
| Boron trifluoride | 5.0 |
| Ethylene glycol | 25.0 |
| 1,1 difluorethane | 70.0 |
| Pressure | 35–40 |

Example 42

| | Percent |
|---|---|
| Potassium tetraborate | 15 |
| Freon-113 | 15 |
| Freon-12 | 70 |
| Pressure | 35–40 |

Example 43

| | Percent |
|---|---|
| Boric acid | 30 |
| Freon-113 | 10 |
| Freon-12 | 60 |
| Pressure | 30–35 |

Example 44

| | Percent |
|---|---|
| Boric acid | 10 |
| Methyl chloroform | 23 |
| Freon-11 | 67 |
| Pressure | 30–35 |

Example 45

| | Percent |
|---|---|
| Potassium bitartrate | 30 |
| Freon-113 | 5 |
| Freon-112 | 5 |
| Freon-12 | 60 |
| Pressure | 30–35 |

Example 46

| | Percent |
|---|---|
| Lithium fluoride | 10 |
| Freon-113 | 15 |
| Freon-112 | 5 |
| Freon-12 | 70 |
| Pressure | 30–35 |

Example 47

| | Percent |
|---|---|
| Potassium bitartrate | 3 |
| Boric acid | 27 |
| Freon-113 | 5 |
| Freon-112 | 5 |
| Freon-12 | 60 |
| Pressure | 30–35 |

Example 48

| | Percent |
|---|---|
| Potassium bitartrate | 15 |
| Boric acid | 15 |
| Freon-113 | 5 |
| Freon-112 | 5 |
| Freon-12 | 60 |
| Pressure | 30–35 |

Example 49

| | Percent |
|---|---|
| Potassium tetraborate | 12 |
| Methanol | 25 |
| Freon-113 | 7 |
| Freon-112 | 6 |
| Freon-12 | 50 |
| Pressure | 30–35 |

It will be found that each of the above examples results in stable pressurized flux packages in which the flux is expelled therefrom in finely divided aerosol form. This results in the formation of a uniform film of the flux material of excellent consistence and high covering characteristics on the surface of the metals to be joined. It will be found further that when the foregoing examples are applied to the metals and the metals subjected to a brazing, welding, or soldering operation, the flux composition functions for its intended purpose in an excellent manner.

Reference is now to be had to FIG. 1, which is illustrative of one form of a pressure type container in which the flux composition is placed therein under the vapor pressure of the propellant to form the flux composition package of the present invention. The embodiment of the container shown in FIG. 1, generally designated by reference numeral 10, comprises a cylindrical body portion 11 suitably attached to a concave bottom wall 12 at the bottom end thereof. An outlet valve 13 is secured in a conventional manner in an opening in the top wall of the body portion 11. The valve 13, as shown, comprises a tube 14 having an inturned flange 15 at its inner end which forms a valve seat. A valve plug 16 carried by valve stem 17 is resiliently held in engagement with the valve seat by a spring 18 which is compressed between the flange 15 and a stop 19 struck from the stem 17. A nozzle 20 is secured to the upper end of the tube 14 and extends laterally from the tube. The stem 17 extends through an opening in the nozzle 20 and is provided with a push button 21 which may be compressed to open the valve. A tube 22 of suitable material is fitted over the tube 14 within the can, and extends to a point near the juncture of the side and bottom walls 11 and 12 of the can substantially in line with a nozzle 20 in order to insure expulsion of substantially all of the can contents when the can is tilted in the direction of the nozzle.

The pressure type container 10 is made of any suitable material capable of withstanding the vapor pressure of the propellant. In general, any suitable metal normally employed in mass produced beer type containers will be found to be satisfactory. However, with respect to various fluxing agents which may be corrosive in character, it will be found advantageous to coat the inner surface of the container with a corrosion inhibiting film of any suitable material, such as, for example, a plastic film or the like. It is to be further understood that the container shown in FIG. 1 is illustrative in character only, and that there is a wide variety of pressure type containers readily available which can be employed equally as well in the present invention. Illustrative examples of such other pressure type containers are shown in United States Patents Nos. 2,723,200, 2,962,196, etc.

The container is filled with the desired composition of fluxing agent and propellant in the proportions explained. The fluxing agent and propellant ingredients of the composition may be separately or simultaneously introduced. The composition or the propellant ingredient thereof is preferably introduced under a pressure above its vapor pressure at the prevailing temperature so that the propellant is in liquid phase except for the small amount in gaseous phase that fills the head space. The composition is mixed in the container by agitation induced by shaking, or by the introduction of the ingredients, and when a fluxing film is required, the valve is opened by depressing the button 21, whereupon the fluxing composition emerges from the nozzle 20 in the form of a fine aerosol spray. With regard to the nozzle 20, it should be noted that particular care should be exercised to insure there will be no clogging thereof. However, in general, the nozzle structures normally used now have been found to be satisfactory.

While there have been described herein what are at present considered preferred embodiments of the invention, it will be obvious to those skilled in the art that modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

We claim:

1. A pressurized flux package comprising a pressure-tight container having a valve-controlled opening and containing a composition for use in producing a flux composition on metal surfaces to be united by brazing, soldering, welding, and the like, comprising a mixture of a flux composition and a volatile propellant in liquid phase, the composition being confined in the container under the vapor pressure of the propellant, said propellant being a non-flammable halogenated hydrocarbon containing at least one fluorine atom, said propellant having a vapor pressure in the range from about 15 to about 300 pounds per square inch gauge at 0° C.

2. A pressurized flux package comprising a pressure-tight container having a valve-controlled opening and containing a composition for use in producing a flux composition on metal surfaces to be united by brazing, soldering, welding, and the like, comprising a mixture of a flux composition and a volatile propellant in liquid phase, the composition being confined in the container under the vapor pressure of the propellant, said propellant being a straight chain, saturated aliphatic hydrocarbon, said propellant having a vapor pressure in the range from about 15 to about 300 pounds per square inch gauge at 0° C.

3. A pressurized flux package comprising a pressure-tight container having a valve-controlled opening and containing a composition for use in producing a flux composition on metal surfaces to be united by brazing, soldering, welding, and the like, comprising a mixture of a flux composition and a volatile propellant in liquid phase, the composition being confined in the container under the vapor pressure or the propellant, said propellant being an inorganic compound, said propellant having a vapor pressure in the range from about 15 to about 300 pounds per square inch gauge at 0° C.

4. A pressurized flux package comprising a pressure-tight container having a valve-controlled opening and containing a composition for use in producing a flux composition on metal surfaces to be united by brazing, soldering, welding, and the like, comprising a mixture of a flux composition, a carrier for the flux composition, and a volatile propellant in liquid phase, the composition being confined in the container under the vapor pressure of the propellant, said propellant being a non-flamable halogenated hydrocarbon containing at least one fluorine atom, said propellant having a vapor pressure in the range from about 15 to about 300 pounds per square inch gauge at 0° C.

5. A package in accordance with claim 1, wherein the carrier and the propellant are the same composition.

6. A pressurized flux package comprising a pressure-tight container having a valve-controlled opening and containing a composition for use in producing a flux composition on metal surfaces to be united by brazing, soldering, welding, and the like, comprising a mixture of a flux composition, a carrier for the flux composition, and a volatile propellant in liquid phase, the composition being confined in the container under the vapor pressure of the propellant, said propellant being a straight chain saturated aliphatic hydrocarbon, said propellant having a vapor pressure in the range from about 15 to about 300 pounds per square inch gauge at 0° C.

7. A package in accordance with claim 2, wherein the carrier and the propellant are the same composition.

8. A pressurized flux package comprising a pressure-tight container having a valve-controlled opening and containing a composition for use in producing a flux composition on metal surfaces to be united by brazing, soldering, welding, and the like, comprising a mixture of a flux composition, a carrier for the flux composition, and a volatile propellant in liquid phase, the composition being confined in the container under the vapor pressure of the propellant, said propellant being an inorganic compound, said propellant having a vapor pressure in the range from about 15 to about 300 pounds per square inch gauge at 0° C.

9. A package in accordance with claim 3, wherein the carrier and the propellant are the same composition.

10. A pressurized flux package comprising a pressure-tight container having a valve-controlled opening and containing a composition for use in producing a flux composition on metal surfaces to be united by brazing, soldering, welding, and the like, comprising a mixture of a flux composition and a volatile propellant in liquid phase, the composition being confined in the container under the vapor pressure of the propellant, said propellant being a halogenated hydrocarbon in which all of the hydrogen atoms are replaced by chlorine and fluorine, with the number of fluorine atoms at least equaling the number of chlorine atoms, said propellant having a vapor pressure in the range from about 15 to about 300 pounds per square inch gauge at 0° C.

11. A pressurized flux package comprising a pressure-tight container having a valve-controlled opening and containing a composition for use in producing a flux composition on metal surfaces to be united by brazing, soldering, welding, and the like, comprising a mixture of a flux composition, and a volatile propellant in liquid phase, the composition being confined in the container under the vapor pressure of the propellant, said propellant being a halogenated hydrocarbon in which all of the hydrogen atoms are replaced by chlorine and fluorine with the number of fluorine atoms being greater than the number of chlorine atoms, said propellant having a vapor pressure in the range from about 15 to about 300 pounds per square inch gauge at 0° C.

12. A flux pressurized package comprising a pressure-tight container having a valve-controlled opening and containing a composition for use in producing a flux composition on metal surfaces to be united by brazing, soldering, welding, and the like consisting essentially of the following by percent weight:

| | Percent |
|---|---|
| Flux agent | 0.01–100 |
| Propellant | 0.01–100 |
| Carrier | 0.00–80 | the composition being confined in the container under the vapor pressure of the propellant, said propellant having a vapor pressure in the range from about 15 to about 300 pounds per square inch gauge at 0° C.

13. A flux pressurized package comprising a pressure-tight container having a valve-controlled opening and containing a composition for use in producing a flux composition on metal surfaces to be united by brazing, soldering, welding, and the like consisting essentially of the following by percent weight:

| | Percent |
|---|---|
| Flux agent | 0.01–40 |
| Carrier | 0.00–80 |
| Propellant | 25.00–80 | the composition being confined in the container under the vapor pressure of the propellant, said propellant having a vapor pressure in the range from about 15 to about 300 pounds per square inch gauge at 0° C.

14. A flux pressurized package comprising a pressure-tight container having a valve-controlled opening and containing a composition for use in producing a flux composition on metal surfaces to be united by brazing, soldering, welding, and the like consisting essentially of the following by percent weight:

| | Percent |
|---|---|
| Flux agent | 7 |
| Carrier | 23 |
| Propellant | 70 | the composition being confined in the container under the vapor pressure of the propellant, said propellant having a vapor pressure in the range from about 15 to about 300 pounds per square inch gauge at 0° C.

15. A flux pressurized package comprising a pressure-tight container having a valve-controlled opening and containing a composition for use in producing a flux composition on metal surfaces to be united by brazing, soldering, welding, and the like consisting essentially of the following by percent weight:

| | Percent |
|---|---|
| Flux agent | 7 |
| Perchloroethylene | 23 |
| Dichlorodifluoromethane | 70 | the composition being confined in the container under the vapor pressure of the propellant, said propellant having a vapor pressure in the range from about 15 to about 300 pounds per square inch gauge at 0° C.

16. A flux pressurized package comprising a pressure-tight container having a valve controlled opening and containing a composition for use in producing a flux composition on metal surfaces to be united by brazing, soldering, welding and the like, consisting essentially of the following by weight percent:

| | Percent |
|---|---|
| Flux agent | 5–100 |
| Propellant | 0–90 |
| Carrier | 0–70 | the composition being confined in the container under a pressure within the range of about 15 to about 65 pounds per square inch gauge measured at 0° F.

17. A flux pressurized package comprising a pressure-tight container having a valve controlled opening and containing a composition for use in producing a flux composition on metal surfaces to be united by brazing, soldering, welding and the like, consisting essentially of the following by weight percent:

| | Percent |
|---|---|
| Flux agent, consisting of 1 part by weight of each of potassium acid fluoride, potassium pentaborate and boric acid | 7 |
| Perchloroethylene | 23 |
| Dichlorodifluoromethane | 70 | the composition being confined in the container under a pressure of 35–40 p.s.i.g. measured at 70° F.

18. A flux pressurized package comprising a pressure-tight container having a valve controlled opening and containing a composition for use in producing a flux composition on metal surfaces to be united by brazing, soldering, welding and the like, consisting essentially of the following by weight percent:

| | Percent |
|---|---|
| Zinc chloride | 2 |
| Ammonium chloride | 1 |
| Stannic chloride | 0.5 |
| Cadmium chloride | 0.25 |
| Methyl salicylate | 1.25 |
| Water | 70 |
| Carbon dioxide | 25 | the composition being confined in the container under a pressure of 15–25 p.s.i.g. measured at 70° F.

19. A flux pressurized package comprising a pressure-tight container having a valve controlled opening and containing a composition for use in producing a flux composition on metal surfaces to be united by brazing, soldering, welding and the like, consisting essentially of the following by weight percent:

| | Percent |
|---|---|
| Potassium acid fluoride | 24 |
| Potassium pentaborate | 6 |
| Butane | 70 | the composition being confined in the container under a pressure of 35–40 p.s.i.g. measured at 70° F.

20. A flux pressurized package comprising a pressure-tight container having a valve controlled opening and containing a composition for use in producing a flux composition on metal surfaces to be united by brazing, soldering, welding and the like, consisting essentially of the following by weight percent:

| | Percent |
|---|---|
| Potassium tetraborate | 2 |
| Potassium acid fluoride | 2 |
| Boric acid | 2 |
| Perchoroethylene | 24 |
| Butane | 70 | the composition being confined in the container under a pressure of 35–40 p.s.i.g. measured at 70° F.

21. A flux pressurized package comprising a pressure-tight container having a valve controlled opening and containing a composition for use in producing a flux composition on metal surfaces to be united by brazing, soldering, welding and the like, consisting essentially of the following by weight percent:

| | Percent |
|---|---|
| Potassium acid fluoride | 7 |
| Trichloroethylene | 25 |
| Propane | 68 | the composition being confined in the container under a pressure of 35–40 p.s.i.g. measured at 70° F.

References Cited by the Examiner

UNITED STATES PATENTS

| | | | |
|---|---|---|---|
| 481,233 | 8/1892 | Kuhns | 222–518 X |
| 2,070,167 | 9/1932 | Iddings. | |
| 2,524,590 | 10/1950 | Boe | 239—8 X |
| 2,667,993 | 2/1954 | Ayres | 222—518 X |
| 2,716,637 | 8/1955 | Bunting. | |
| 2,748,984 | 6/1956 | Seymour | 222—394 X |
| 2,764,454 | 9/1956 | Edelstein | 252—305 X |
| 2,766,157 | 10/1956 | Peterson. | |
| 2,907,104 | 10/1959 | Brown et al. | 29—495 X |
| 2,995,278 | 8/1961 | Clapp. | |
| 3,006,790 | 10/1961 | Ewing | 148—23 |
| 3,035,339 | 5/1962 | Matter et al. | 148—23 X |
| 3,086,893 | 4/1963 | Konig | 148—23 |
| 3,112,723 | 12/1963 | Potocki | 29—495 X |

OTHER REFERENCES

Pressurized Packaging (Aerosols) 1958, by A. Herzka and J. Pickthall, pp. 9, 19–28, Butterworth Scientific Publications, London.

RAPHAEL M. LUPO, *Primary Examiner.*

UNITED STATES PATENT OFFICE
CERTIFICATE OF CORRECTION

Patent No. 3,275,201                              September 27, 1966

William R. Tedeschi et al.

It is hereby certified that error appears in the above numbered patent requiring correction and that the said Letters Patent should read as corrected below.

Column 1, line 29, for "composition" read -- compositions --; column 2, line 3, for "addition" read -- additional --; line 13, for "surface" read -- surfaces --; line 15, for "composition" read -- compositions --; line 30, "abject" read -- object --; line 41, after "new" insert -- and --; column 3, line 27, for "13" read -- 23 --; column 10, line 32, for "2.0" read -- 0.2 --.

Signed and sealed this 29th day of August 1967.

(SEAL)
Attest:

ERNEST W. SWIDER                                       EDWARD J. BRENNER
Attesting Officer                                          Commissioner of Patents